United States Patent [19]
Reser

[11] 3,965,361
[45] June 22, 1976

[54] X-RAY FILM LOADER
[75] Inventor: G. Louis Reser, Cincinnati, Ohio
[73] Assignee: Sybron Corporation, Rochester, N.Y.
[22] Filed: Nov. 29, 1974
[21] Appl. No.: 528,136

[52] U.S. Cl. .................................. 250/468; 271/34
[51] Int. Cl.² .......................................... G11B 1/00
[58] Field of Search ............... 250/468; 271/34, 35, 271/238, 240

[56] References Cited
UNITED STATES PATENTS

| | | | |
|---|---|---|---|
| 3,103,355 | 9/1953 | Hubbard et al. | 271/34 |
| 3,350,091 | 10/1967 | Masterson et al. | 271/40 |
| 3,553,453 | 1/1971 | Hogan | 250/468 |
| 3,856,132 | 12/1974 | Sakurai et al. | 271/34 |

Primary Examiner—Alfred E. Smith
Assistant Examiner—D. C. Nelms
Attorney, Agent, or Firm—Theodore B. Roessel; James A. Rich

[57] ABSTRACT

An automatic x-ray film loader is provided with film transports for moving the film to or from an exposure station that automatically correct improperly aligned sheets of film. The speed of at least one of the transports is automatically adjusted so that sheets are transferred from one transport to another smoothly and evenly. A simplified system for clamping the sheets of film between two intensifier plates and for moving one of these plates so that sheets of film can be fed to or moved away from the plates is also provided.

5 Claims, 7 Drawing Figures

X-RAY FILM LOADER

BACKGROUND OF THE INVENTION:

This invention relates to radiography, and more particularly to apparatus for handling cut sheets of x-ray film.

In some radiographic systems, such as the one shown in U.S. Pat. No. 3,553,453 -- Hogan, sheets of x-ray film are automatically moved one at a time from a supply magazine to an exposure station where they are clamped between image intensifier plates. After the film is exposed it is then moved automatically to a receiver magazine. A system of this sort should provide rapid changing of the film and minimize chances of jamming or damaging the film as it moves through the system. Furthermore, in order to achieve good quality x-rays, the image intensifier plates should conform to each other so that there are no gaps between the film and one of the plates, which can cause blurring of the film.

SUMMARY OF THE INVENTION:

It is an object of this invention to provide apparatus for transporting cut sheets of x-ray film one at a time to or from an exposure station that automatically corrects for misalignment of the sheets of the x-ray film and keeps the film moving in the desired direction. The invention provides first and second guides which define a film pathway and restrict lateral movement of a sheet of film in the pathway. A first drive means, such as a pair of endless belts or an endless belt and a roller, positioned adjacent to the first guide, grips one lateral edge of a sheet of film that is being transported. A second drive means, positioned adjacent to said second guide, grips the other lateral edge of the sheet of film. Both the first and second drive means are adapted to allow the film to slip if an edge of the film strikes one of the guides. As a result, if the film is misaligned or tries to move out of the pathway defined by the first and second guides, it will slip in at least one of the drive means and automatically align itself properly.

Another object of the invention is provide apparatus for handling cut sheets of x-ray film in which the cut sheets are transferred smoothly and evenly from one film transport to another. According to the invention, the leading edge of a sheet is picked up by the second film transport before the trailing edge of the sheet leaves the first film transport. At least one of the transports is driven by a motor that operates at a speed inversely related to its output torque, and the unloaded speed of the second film transport is slightly faster than the loaded speed of the first film transport. As a result, when the leading edge of the sheet is picked up by the second film transport, this transport tends to pull the sheet away from the first film transport. This either causes the second film transport to slow down, the first film transport to speed up, or both, so that both film transports are moving the sheet at the same speed.

Yet another object of this invention is to provide simplified means for clamping sheets of x-ray film between intensifier plates at an exposure station and for separating the plates so that an input film transport can feed sheets between the plates or so that an exit film transport can take the sheets away from the exposure station. According to the invention, a fixed intensifier plate and a movable intensifier plate are provided at the exposure station. The movable intensifier plate is mounted on a support that allows this plate to reciprocate towards and away from the fixed intensifier plate, and also the movable intensifier plate to pivot about an edge adjacent to the input film transport or about an edge adjacent to the exit film transport. The center of the movable intensifier plate support is biased towards the fixed intensifier plate, so that the fixed and movable intensifer plates conform to each other and the x-ray film is clamped firmly between the plates. Means are provided for pulling the edge of the movable intensifer plate adjacent to the input film transport away from the fixed intensifier plate so that the input film transport can feed a sheet of film between the intensifier plates, and means are provided for pulling the edge of the movable intensifier plate adjacent to the exit film transport away from the fixed intensifier plate so that the exit film transport can carry the film away from the intensifier plates.

Other objects and advantages of this invention will be apparent from the following description.

Figure 1:
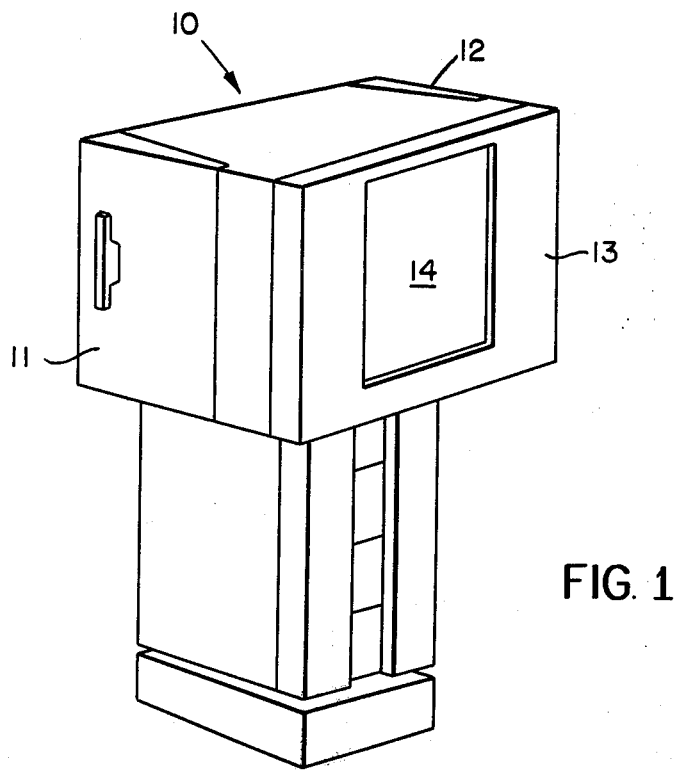
FIG. 1 is a perspective view of an automatic x-ray film loader in which this invention may be utilized.
Figure 2:
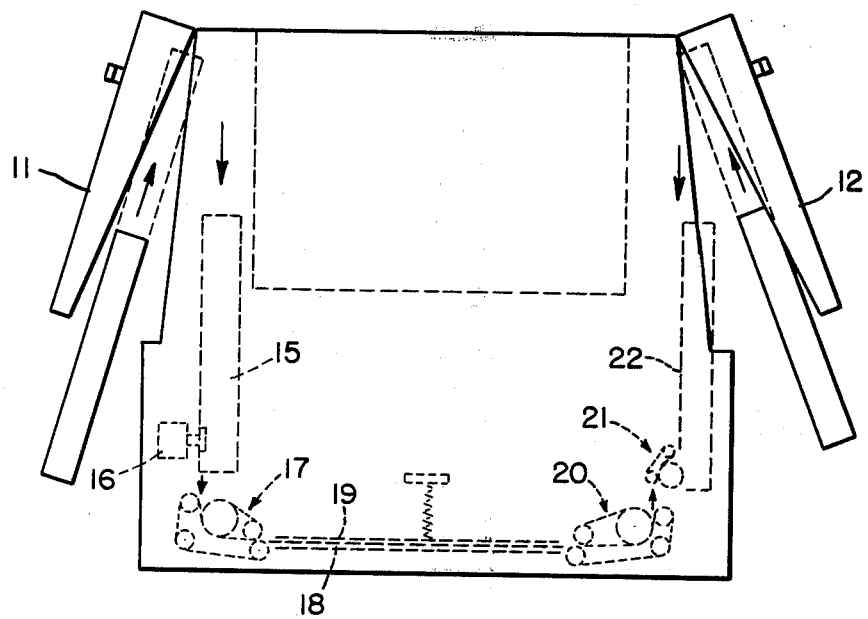
FIG. 2 is a plan view of the loader in FIG. 1 illustrating the movement of film through the system.

DETAILED DESCRIPTION:

The automatic x-ray film loader 10 illustrated in FIG. 1 has a door 11 on one side for insertion of a supply magazine loaded with cut sheets of x-ray film, a second door 12 on the other side for insertion of an empty receiver magazine in which the exposed film is stored, and a third door 13 on the front of the loader than can be opened to provide access to the intensifier plates and the various film transports utilized in the system. An x-ray transparent window 14 in the front door 13 defines an exposure station where the patient is positioned. Referring to FIG. 2, as the loading door 11 is closed and locked, a supply magazine 15 is automatically moved into position next to a pick-up or film separator assembly 16. At the same time, a door in the magazine is opened so that the sheets of film may be pulled from the magazine. The pick-up assembly 16, which is shown in more detail in the copending application of Edwin L. Sohngen, Ser. No. 382,048, filed July 23, 1973, feeds sheets of x-ray film one at a time to an input film transport 17 that carries the sheets to the exposure station, where they are clamped between a fixed intensifier plate 18 and a movable intensifier plate 19. After the film is exposed, an exit film transport 20 carries the film to a receiver loading transport 21, which deposits the film in a receiver magazine 22.

Figure 3:
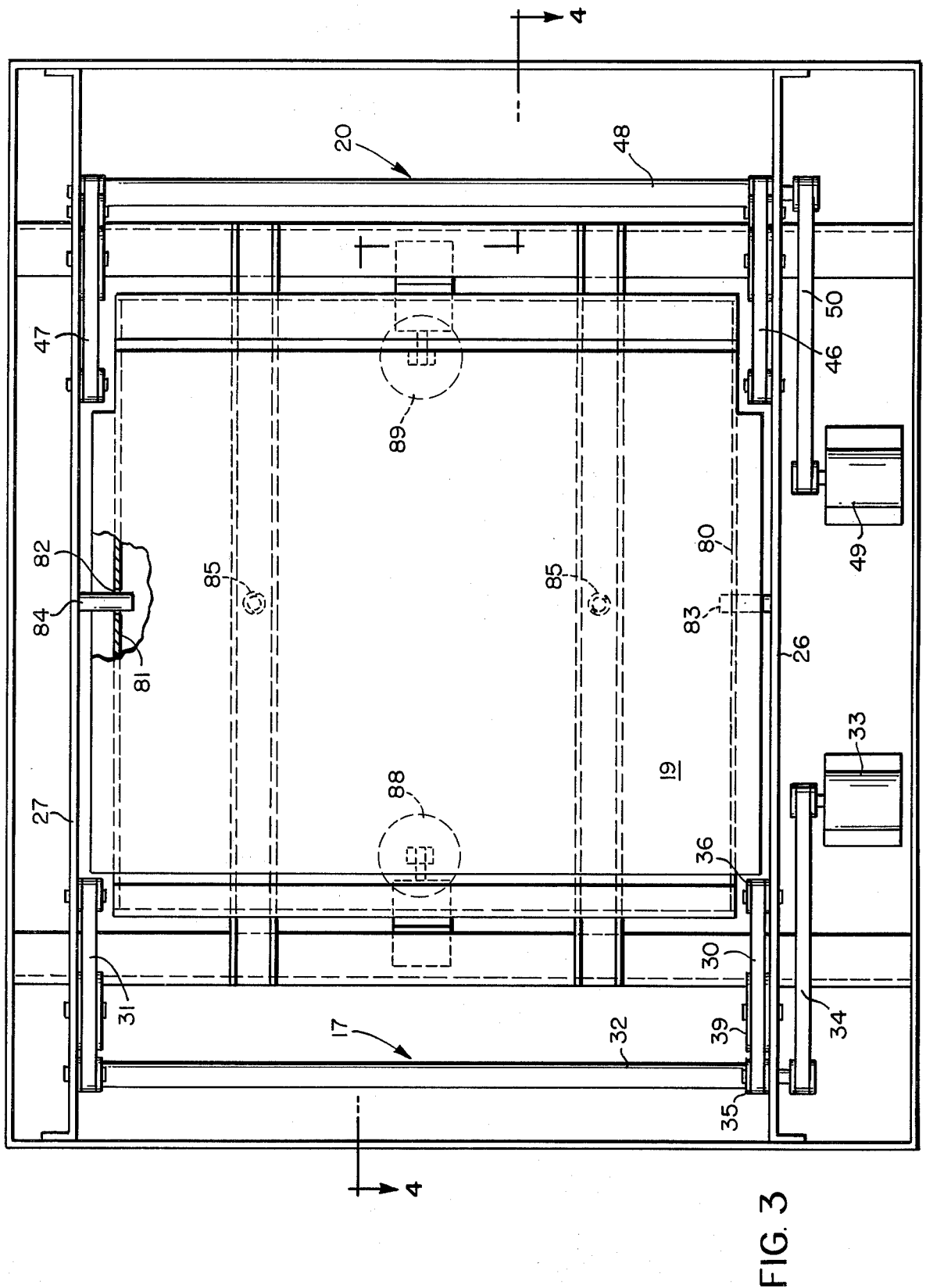
FIG. 3 is a front elevation view with the front door of the loader opened to illustrate some of the internal components.

FIG. 3 is a front elevation view of the film loader 10 with the front door opened to expose the input film transport 17, the movable intensifier plate 19 and the exit film transport 20. The fixed intensifier plate, which is mounted on the front door, does not appear in this view.

The film transports are supported by horizontal guide plates 26, 27 that are positioned slightly farther apart than the width of the sheets of film. Plates 26 and 27 define the pathway that the film follows in moving through the loader; and restrict lateral, i.e., vertical, movement of a sheet of film in this pathway.

The input transport 17 includes two endless belts 30, 31 driven by a shaft 32 that extends from the upper guide plate 27 through the lower guide plate 26 and is driven by a motor 33 and belt 34 positioned below the lower guide plate 26. As may be seen in FIGS. 3 and 4, the lower driven belt 30 is positioned just above the lower guide plate 26 and supported by pulleys 35, 36 mounted in plate 26. The upper driven belt 31 is positioned just below the upper horizontal guide plate 27 and is supported by pulleys mounted in that plate.

The lower edge of a sheet of x-ray film to be moved through the system is gripped between the lower driven belt 30 and a lower idler belt 38, which is also positioned adjacent to the lower guide plate and supported on pulleys 39, 40 mounted in the lower guide plate. Similarly, the upper edge of the film is gripped between the upper driven belt 31 and an upper idler belt (not shown) positioned adjacent to the upper guide plate and supported by pulleys mounted in that plate. The upper idler belt and the mounting systems for the upper idler and driven belts are substantially the same as the corresponding parts for the lower driven and idler belts illustrated in FIG. 4.

Figure 4:
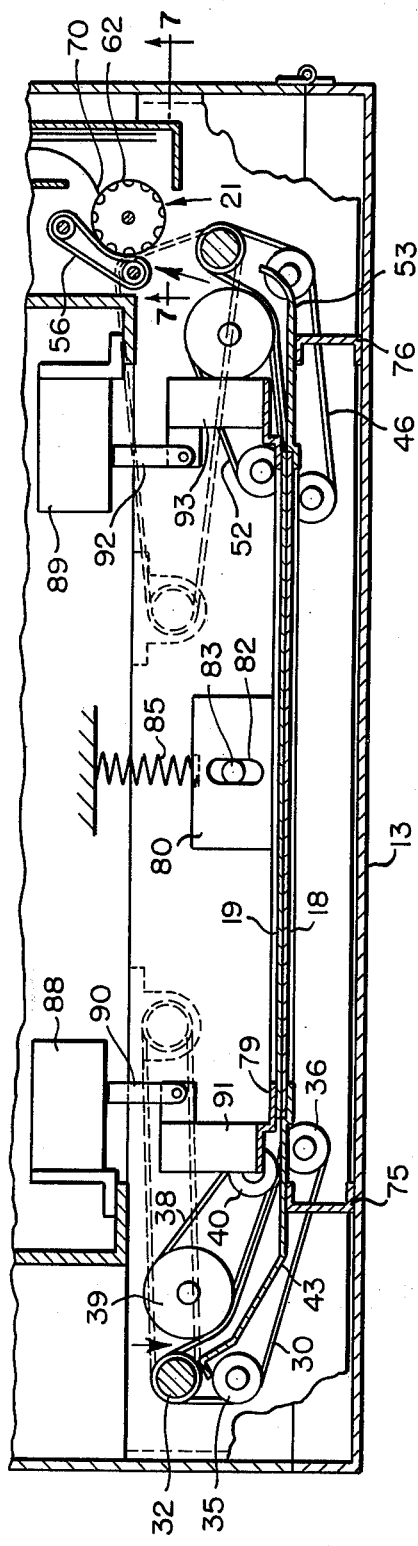
FIG. 4 is a cross-sectional plan view taken along lines 4—4 of FIG. 3.

As may be seen in FIG. 4, the lower driven belt 30 wraps partially around the pulleys 39, 40 supporting the lower idler belt 38. Pulley 35, which supports the lower driven belt 30, is adjustably mounted so that the tension in belt 30 and the pressure it exerts on the lower idler belt 38, or the pressure which these belts exert on a film held between them, can be adjusted. A similar system maintains the desired gripping force between the upper idler and driven belts.

The pressure between the driven and idler belts is adjusted so that the x-ray film will be driven positively as long as its progress is unimpeded, but will be able to slip with respect to either the upper or lower driven belts if an edge of the film strikes or drags along either the upper or lower guide plate 27, 26. Preferably, in order to facilitate this slippage, the belts are relatively soft and are maintained under slight tension. One type of belt that has been found to be satisfactory is a fiber cored, urethane coated belt.

Allowing the film to slip with respect to either of the driven belts makes the input film transport self-aligning. If the film tries to move out of the path defined by the horizontal guide plates 26, 27, an edge of the film will strike one of these plates and the belts will automatically allow the film to slip so that the film moves in the proper pathway to the intensifier plates.

As may be seen in FIGS. 2 and 4, wrapping the driven belts around the corresponding idler belt not only maintains the desired gripping force between them, but also causes the film to move through a curved path. The curvature in the direction of motion imposed on the film by these belts stiffens the upper and lower edges of the film and makes them less susceptible to bending when the film strikes one of the horizontal guide plates 26, 27. Thus, this curvature facilitates the self-aligning action described above.

As the film moves through the curved path defined by the various belts of the input film transport, the center portion of the film is supported by a fixed guide 43, illustrated in FIG. 4, that also serves as part of the support system for the fixed intensifier plate 18. Preferably, the fixed guide 43 extends vertically from just below the upper driven belt 31 to just above the lower driven belt 30.

The exit film transport 20, which is also illustrated in FIGS. 3 and 4, is much like the input film transport 17. It includes a lower driven belt 46 and an upper driven belt 47 that run off a shaft 48 driven by a belt 50 and motor 49 positioned beneath the lower guide plate 26. It also includes a lower idler belt 52 and a corresponding upper idler belt. These belts, like their counterparts in the input film transport, are supported on pulleys mounted in the upper and lower horizontal guide plates 27, 26. As with the input transport, the driven belts 46, 47 of the exit transport partially wrap around and exert a light pressure on the corresponding idler belts so that the x-ray film can slip in the exit transport to allow for misalignment. Since the exit film transport also moves the film through a curved path, a second fixed guide plate 53, which extends vertically from just below the upper driven belt 47 to just above the lower driven belt 46, is provided.

The belts of the input and exit film transports are arranged so that the exit film transport will pick up the leading edge of a sheet of x-ray film before the trailing edge of the sheet leaves the input film transport. In order to provide automatic adjustment of the speed of the two transport systems with respect to each other, the input transport motor 33 and/or the exit transport motor 49 should be motors, such as shaded pole induction motors, that operate at a speed inversely related to their output torque. Preferably, both motors are of this type.

With motors of this type, the load imposed on the transports by the sheets of x-ray films slows the transports down slightly. Thus, if the input and exit transports are designed to operate at substantially the same unloaded speed, which is the preferred mode of operation, the unloaded exit transport will be operating at a slightly faster speed than the loaded input transport when the exit film transport picks up the leading edge of a sheet of film. Thus, the exit transport will tend to pull the sheet of film away from the input transport, and the load will be redistributed between the two transports so that they operate at substantially the same speed unitl the trailing edge of the film has left the input transport. This ensures that the sheets of film are transferred smoothly and evenly from the input to the exit transport.

Figure 7:
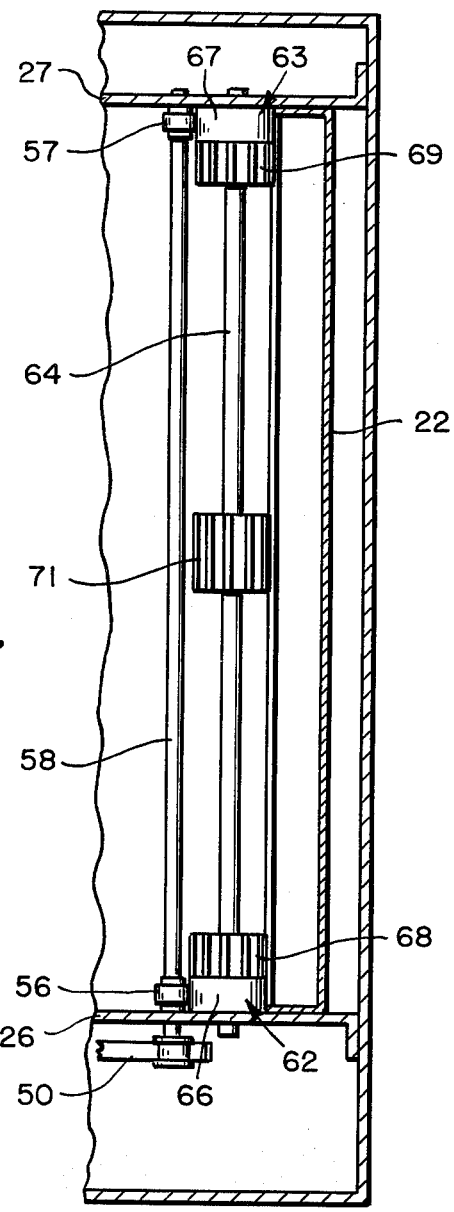
FIG. 7 is a sectional front elevation view taken along lines 7—7 of FIG. 4.

The receiver film transport 21, which takes the sheets of film from the exit transport and deposits them in the receiver magazine 22, is illustrated in FIGS. 4 and 7. This transport, like the input and exit film transports, includes a lower driven belt 56 and an upper driven belt 56 that are powered by a drive shaft 58 that extends between the upper and lower horizontal guide plates 27, 26. Drive shaft 58 is powered by the belt 50 and motor 49 that also drive the exit film transport system.

In the receiver transport 21, the lower edge of the sheet of film is gripped between belt 56 and a lower idler roller 62, and the upper edge of the sheet of film is gripped between upper driven belt 57 and an upper idler roller 63. Idler rollers 62, 63 are mounted on a shaft 64 extending between the horizontal guide plates 26, 27. As may be seen in FIG. 4, the driven belts 56, 57 are partially wrapped around the idler rollers 62, 63. The pressure that the belts and rollers exert on the film is adjusted so that the sheets of film can slip in the receiver transport 21, as in the input and exit film transports, to compensate for any misalignment.

The idler rollers 62, 63 each have a cylindrical section 66, 67 with a relatively smooth surface and an adjacent corrugated section 68, 69. The driven belts 56, 57 wrap around the cylindrical sections of the rollers. As may be seen in FIG. 4, the corrugated sections 68, 69 of idler rollers 62, 63 catch the trailing edge 70 of each sheet of x-ray film as it moves from between the belts 56, 57 and rollers 62, 63 of the receiver loading transport, and carry this edge around the rollers into the receiver magazine 22. Preferably, a similar corrugated roller 71 is provided in the center of idler shaft 64 to provide additional contact with the trailing edge 70 of the sheet of x-ray film.

The intensifier plates 18, 19, between which the sheets of film are clamped while an exposure is made, and the associated mounting means are illustrated in FIGS. 3 through 6. The intensifier plates, like plates in similar prior art systems, are thin sheets of an x-ray pervious material, such a aluminum or phenolic, with a coat of luminescent material deposited thereon. Preferably, one of the plates is made slightly more flexible than the other to ensure that the plates will conform to each other when they are clamped together and thereby prevent blurring of the film.

As was mentioned above, the fixed intensifier plate 18 is mounted on a pair of plates 43, 53 which also function as guides for the sheets of film in the input and exit film transports. As may be seen in FIG. 4, plates 43 and 53 are mounted on channels 75, 76 attached to the front door 13 of the film loader.

Figure 5:
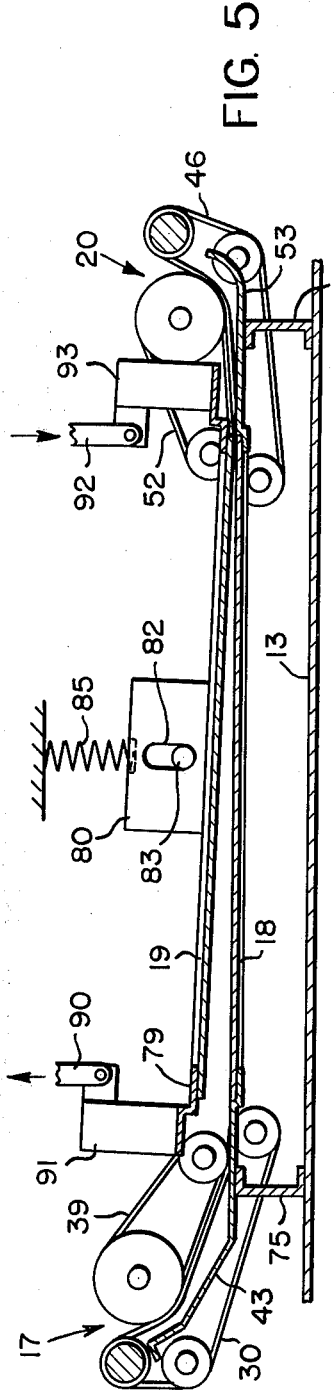
FIGS. 5 and 6 are partial plan views, taken from the same vantage point as FIG. 4, illustrating different positions of the movable intensifier plate utilized in the system.
Figure 6:
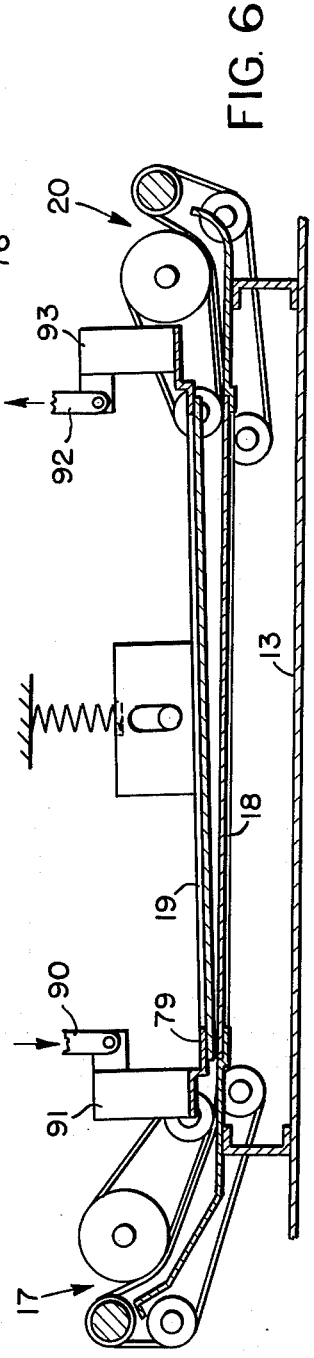

The movable intensifier plate 19 is mounted on a support 79 that allows the movable intensifier plate to reciprocate towards and away from the fixed intensifier plate 18 and also allows the movable intensifier plate to pivot about its edges, as shown in FIGS. 5 and 6, to permit the sheets of film to be moved to and from the exposure station. Plates 80, 81, extend from the top and bottom of support 79. Each of these plates contains an elongated slot 82. Pins 83, 84 extend from the horizontal guide plates 26 and 27 through these elongated slots. One or more coil springs 85 urge the center of support 79 towards the fixed intensifier plate 18. Thus, the movable intensifier plate is normally held in position by the mounting plates 80 81 and pins 83, 84, and pressed firmly against the fixed intensifier plate 18 by the coil springs 85.

The edges of the movable intensifier plate 19 are pivoted away from the fixed intensifier plate 18 by solenoids 88, 89 attached to the main frame of the film loader. The shaft 90 of solenoid 88 is pivotally connected to a bracket 91 connected to the edge of support 79 adjacent to the input film transport. When solenoid 88 is energized, it pulls the edge of the movable intensifier plate 19 away from the fixed intensifier plate 18, as shown in FIG. 5, so that the input film transport 17 can feed a sheet of x-ray film between the intensifier plates. Similarly, the shaft 92 of solenoid 89 is pivotally attached to bracket 93 connected to the end of support 79 adjacent to the exit film transport. Energizing solenoid 89 pulls this edge of the movable intensifier plate 19 away from the fixed intensifier plate, as shown in FIG. 6, and allows the exit film transport 20 to move the exposed film from between the plates.

OPERATION

A cycle of the illustrated film loader is commenced by activating controls that energize solenoid 88, pulling the movable intensifier 19 into the position shown in FIG. 5. These same controls also activate the film separator assembly 16 and the motors 33, 49 of the various film transports. The film separator assembly 16 picks up a sheet of x-ray film from the supply magazine 15 and moves it into the input film transport 17, which carries it to the exposure station. Just before the film arrives at the desired position at the exposure station it is picked up by the exit film transport 20. As was mentioned above, the speeds of the input and exit film transports are automatically adjusted by the operating characteristics of motors 33 and 49 so that the film is transferred smoothly and evenly from one transport to the other. When the film reaches the proper position at the exposure station a photo-optic device stops the drive motors 33, 49 and de-energizes solenoid 88, so that the movable intensifier plate 19 is pressed against the fixed intensifier plate 18 by coil spring 85.

When the film has been exposed, solenoid 89 is energized to pivot the movable intensifier plate 19 into the position shown in FIG. 6, thereby freeing the film so that the exit film transport 20 and the receiver loading transport 21 may move the film into the receiver magazine. The system is then ready for another cycle.

As may be seen from the foregoing, the illustrated system provides a relatively simple means for moving individual sheets of film from the supply magazine to the exposure station and on to the receiver magazine. The system minimizes binding or jamming of sheets of film and insures that the sheets are clamped positively between the intensifier plates at the exposure station. Of course, those skilled in the art may make various modifications to the system described above within the scope of this invention, which is defined by the following claims.

I claim:

1. Apparatus for transporting cut sheets of x-ray film one at a time to or from an exposure station comprising:

first and second guides defining a film pathway and restricting lateral movement of a sheet of film in said pathway;

a first pair of endless belts positioned adjacent to said first guide and adapted to grip one lateral edge of said sheet of film; and a second pair of endless belts positioned adjacent to said second guide and adapted to grip the other lateral edge of said sheet of film;

said first and second pairs of endless belts being adapted to allow said film to slip when an edge of the film strikes one of said guides, whereby the film will automatically slip in relation to at least one of said pairs of endless belts and align itself properly in said pathway.

2. Apparatus according to claim 1 wherein one belt of each pair is supported by a pair of pulleys and the other belt of each pair is partially wrapped around said pulleys, whereby the belts move the film through a curved path of travel.

3. Apparatus according to claim 2 further comprising a fixed guide positioned between said pairs of belts and adapted to support the central portion of the film as it moves through the curved path defined by said belts.

4. Apparatus for transporting cut sheets of x-ray film one at a time to or from an exposure station comprising:

first and second guides defining a film pathway and restricting lateral movement of a sheet of film in said pathway;

first drive means, comprising a roller and an endless belt partially wrapped around said roller, positioned adjacent to said first guide and adapted to grip one lateral edge of said sheet of film; and second drive means, comprising a second roller and a second endless belt partially wrapped around said second roller, positioned adjacent to said second guide and adapted to grip the other lateral edge of said sheet of film;

said first and second drive means being adapted to allow said film to slip when an edge of the film strikes one of said guides, whereby the film will automatically slip in relation to at least one of said drive means and align itself properly in said pathway.

5. Apparatus according to claim 4 wherein each of said rollers comprises a cylindrical section with a relatively smooth surface, said belt being partially wrapped around said cylindrical section, and a corrugated section adjacent to said cylindrical section, said corrugated section being adapted to catch an edge of a sheet of film as it moves from between said belt and said roller.

* * * * *